C. L. Pierce,
Drag Saw.
N°53,670.   Patented Apr. 3, 1866.
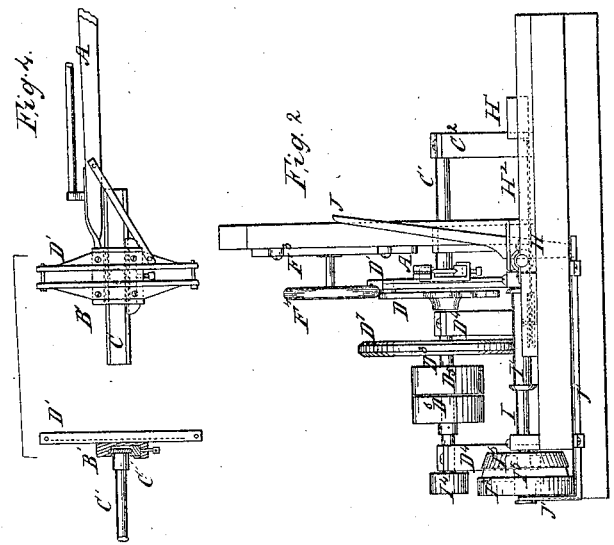
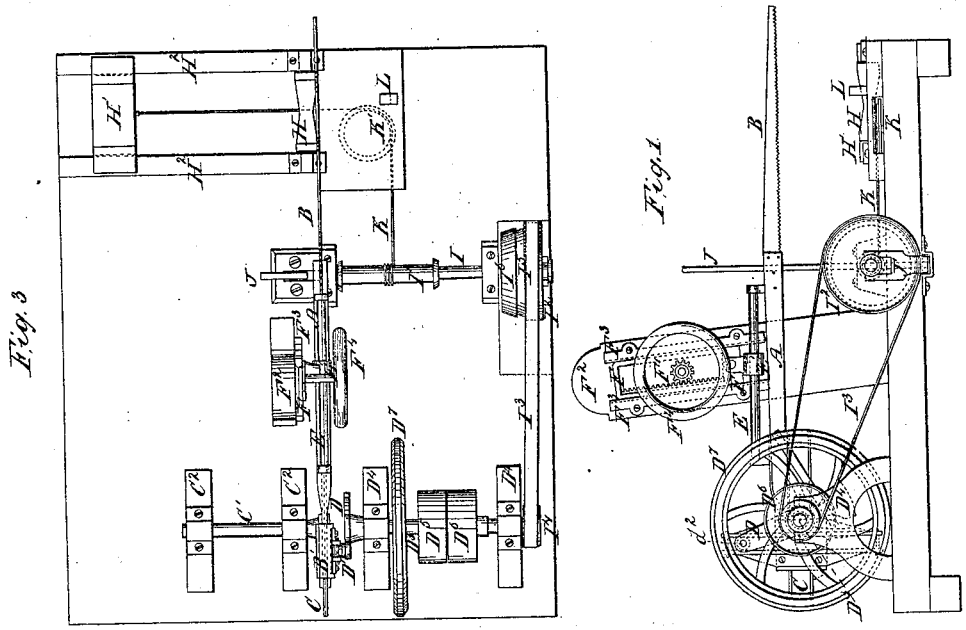
Witnesses
B. H. Muehle
F. Langworthy
Inventor
Chas. L. Pierce

UNITED STATES PATENT OFFICE.

CHARLES L. PIERCE, OF BUFFALO, NEW YORK.

IMPROVEMENT IN SAWING-MACHINES.

Specification forming part of Letters Patent No. 53,670, dated April 3, 1866.

*To all whom it may concern:*

Be it known that I, CHARLES L. PIERCE, of the city of Buffalo, county of Erie, and State of New York, have invented certain new and useful Improvements in Drag-Saws; and I do hereby declare that the following is a full, clear, and exact description thereof, reference being had to the accompanying drawings, making a part of this specification, in which—

Figure I is a side elevation of my said machine. Fig. II is an end elevation, and Fig. III a plan of same; and Fig. IV, details.

The nature of this invention consists, first, in supporting a drag-saw bar having its reciprocating motion produced by a crank by a slide bar or guide supported upon a rock-shaft placed in line with the crank-shaft, so that the saw-bar may change its angle as required during the passage of the saw through the log without affecting the action of the crank in driving the saw-bar; second, in the combination, with the slide-bar arranged as stated, of a slotted cross-head in which the crank-pin works to give the reciprocating motion to the bar; third, in supporting the saw-bar at a point between the driving-crank and saw by an adjustable guide-box, which may be raised or lowered by a rack and pinion to control the feed of the saw as required; fourth, in an arrangement of mechanism for feeding the log forward as the blocks are cut from it by the saw.

Letters of like name and kind refer to like parts in each of the figures.

A represents the saw-bar carrying the drag-saw B at one end and attached at the other to a slide-block, B', working on the slide-bar C.

D represents the driving-crank, and D' a slotted cross-head bolted to the slide-block B', the crank-pin $d^2$ working in its slot and by its revolution giving the required reciprocating motion to the saw.

The slide-bar C is hung upon a rock-shaft, C', placed in line with the crank-shaft $D^3$, so that said rock-shaft forms a center of vibration for the saw-bar and saw when they require to be raised or lowered in working. A change in the angle of the saw-bar requires a corresponding change in the angle of the slide-bar, so that they always maintain the same relative position.

The slide-bar being hung upon the rock-shaft in line with the crank-shaft, any variation in its angle and that of the saw-bar does not affect the position or movement of the saw-bar by the crank, since in any position of said saw-bar its line of movement passes through the axis of the crank.

The slide-block B' is provided with a gib and set-screws, so that it may be readily fitted to the slide-bar and any wear in the block or slide easily taken up.

The crank-shaft $D^3$ is supported by appropriate pillow-blocks $D^4$ and carries fast and loose driving-pulleys $D^5$ $D^6$ and a fly-wheel, $D^7$.

The rock-shaft C' is also supported upon pillow-blocks $C^2$, and in line with the crank-shaft, as before stated.

The saw-bar is guided at a point between the crank and saw by a slide-rod, E, working through a guide-box, E', made vertically adjustable by its connection with a rack-frame, F, which frame may be raised or lowered by a pinion, F', having its bearings in the vertical post $F^2$, said rack-frame moving between side guides, $F^3$, secured to the post $F^2$.

The slide-rod E is secured to the saw-bar parallel thereto and to the slide-bar C, and the guide-box E' is secured to the rack-frame by a stud or bolt, $e^2$, so that as the box is raised or lowered it will accommodate itself to the changes of angle in the saw-bar and allow the slide-rod E to move freely and without binding therein. The shaft of the pinion F carries a hand-wheel, $F^4$, by which it may be operated. By this device the saw is readily raised or lowered or retained in any desired position, and its feed into the log brought under perfect and easy control.

H represents a bed-roller, and H' a sliding chock, both being supported by the bed-timbers $H^2$, the roller turning in fixed bearings, but the chock capable of sliding on the bed-timbers.

I is a shaft carrying a windlass-barrel, I', and a driving-pulley, $I^2$, and receiving motion by the belt $I^3$ from the pulley $I^4$ on the crank-shaft, or, as may sometimes be more convenient, from a counter-shaft overhead. The driving-pulley is made with a cone-face, $I^5$, at one side, which fits a female cone-wheel, $I^6$, keyed upon the shaft, the wheel being loose upon the shaft.

By means of a lever, J, acting through a rod, J', turned upward at one end and forked and clasping the hub of the pulley I², which hub has a groove turned therein for this purpose, the pulley-cone may be moved into the female cone with any required degree of force to create sufficient friction to cause the motion of the pulley to be imparted to the windlass. A rope or chain, K, leading from the windlass-barrel and passing around a shieve, K', connects with the sliding chock H', so that by means of the windlass the chock may be made to slide on the bed-timbers H² toward the roller H.

The saw-log is supported upon the roller and chock, and as a block is cut therefrom by the saw is fed forward by throwing the windlass into gear until it strikes a buffer guide-post, L. This buffer-post should be of sufficient strength to overcome the friction of the cone-clutch, so that in case the attendant fails to throw the same out of gear at the exact time no damage may ensue.

Having thus described my invention, what I claim, and desire to secure by Letters Patent, is—

1. Supporting a drag-saw bar, A, at its rear end by a rocking slide-bar, C, whose axis is in line with the axis of the driving-crank, in the manner and for the purpose set forth.

2. The combination of the slide-bar A, arranged as stated, with the driving-crank and slotted cross-head, in the manner and for the purpose set forth.

3. Supporting the saw-bar A at a point between the driving-crank and saw by the adjustable guide-box E' and adjusting rack-frame F and pinion F', for the purpose and substantially as described.

4. The combination of the windlass I' and friction-clutch I⁵ I⁶ with the pulley K, sliding chock H', and buffer guide-post L, arranged and operating in the manner and for the purpose set forth.

CHAS. L. PIERCE.

Witnesses:
B. H. MUEHLE,
F. A. LANGWORTHY.